US008855560B2

(12) United States Patent
Lee et al.

(10) Patent No.: US 8,855,560 B2
(45) Date of Patent: Oct. 7, 2014

(54) METHOD AND SYSTEM FOR CONNECTING AN END-POINT TERMINAL TO A PLURALITY OF MOBILE COMMUNICATION TERMINALS TO BE PROVIDED WITH A SERVICE IN A CPNS ENVIRONMENT, AND CPNS SERVER AND END-POINT TERMINAL FOR SAME

(75) Inventors: Jeong Hoon Lee, Seoul (KR); Jeong Min You, Seoul (KR); In Hwan Kim, Seoul (KR)

(73) Assignee: SK Telecom Co., Ltd. (KR)

(*) Notice: Subject to any disclaimer, the term of this patent is extended or adjusted under 35 U.S.C. 154(b) by 535 days.

(21) Appl. No.: 13/147,391

(22) PCT Filed: Oct. 13, 2009

(86) PCT No.: PCT/KR2009/005861
§ 371 (c)(1),
(2), (4) Date: Aug. 2, 2011

(87) PCT Pub. No.: WO2010/098527
PCT Pub. Date: Sep. 2, 2010

(65) Prior Publication Data
US 2011/0294430 A1 Dec. 1, 2011

(30) Foreign Application Priority Data

Feb. 24, 2009 (KR) .................. 10-2009-0015151

(51) Int. Cl.
*H04B 7/00* (2006.01)
*H04W 76/02* (2009.01)
*H04W 4/00* (2009.01)
*H04W 88/04* (2009.01)

(52) U.S. Cl.
CPC ............ *H04W 76/026* (2013.01); *H04W 88/04* (2013.01); *H04W 4/00* (2013.01)
USPC .......................................... 455/41.2; 455/411

(58) Field of Classification Search
CPC ... H04M 1/7253; H04W 84/18; H04W 8/005; H04W 12/06
USPC .................................................. 455/41.2, 411
See application file for complete search history.

(56) References Cited

U.S. PATENT DOCUMENTS

2004/0259589 A1* 12/2004 Bahl et al. .................. 455/553.1
2006/0258289 A1* 11/2006 Dua ............................. 455/41.3

(Continued)

FOREIGN PATENT DOCUMENTS

| JP | 2001-274936 | 10/2001 |
| JP | 2002-290509 | 10/2002 |
| JP | 2003-101676 | 4/2003 |
| JP | 2003-283421 | 10/2003 |
| JP | 2005-244366 | 9/2005 |

(Continued)

*Primary Examiner* — April G Gonzales
(74) *Attorney, Agent, or Firm* — Baker & Hostetler LLP

(57) ABSTRACT

The present invention is a method and system, with the system comprising an CPNS server and an end-point terminal for connecting the end-point terminal to a plurality of mobile communication terminals for providing the end-point terminal with a variety of services in a CPNS environment. The CPNS server makes a request for a CPNS service via a second mobile communication terminal, analyzes the request as transmitted to provide the end terminal with the service. The end-point terminal is connected to the first mobile communication terminal through a short-range wireless communication network for performing the CPNS service and is connected to a second mobile communication terminal through short-range wireless communication during the performance of the CPNS server to request and receive specific CPNS service from the CPNS server. Since the end-point terminal is connected to a plurality of mobile communication terminals and provided with CPNS services, the end-point terminal can simultaneously provide a variety of services.

20 Claims, 4 Drawing Sheets

(56) References Cited

U.S. PATENT DOCUMENTS

| | | |
|---|---|---|
| 2007/0065107 A1* | 3/2007 | Ryu et al. .................. 386/95 |
| 2008/0107249 A1* | 5/2008 | Kim et al. ............... 379/93.03 |
| 2009/0075584 A1* | 3/2009 | Jung et al. ................ 455/3.01 |
| 2009/0305630 A1* | 12/2009 | Kuroda et al. ............. 455/41.1 |
| 2010/0062770 A1* | 3/2010 | Flynn et al. ............... 455/436 |
| 2011/0002260 A1* | 1/2011 | Kim .......................... 370/328 |
| 2011/0207403 A1* | 8/2011 | Kim et al. ................. 455/41.1 |
| 2011/0212689 A1* | 9/2011 | Kim et al. ................. 455/41.1 |

FOREIGN PATENT DOCUMENTS

| | | |
|---|---|---|
| JP | 2005-341310 | 12/2005 |
| JP | 2012507099 | 3/2012 |
| JP | 2012507915 | 3/2012 |
| JP | 2012507967 | 3/2012 |
| JP | 2012507969 | 3/2012 |
| KR | 100644546 | 11/2006 |
| KR | 10-2008-0075643 | 8/2008 |
| WO | 2008/009838 | 1/2008 |

* cited by examiner

Fig. 3

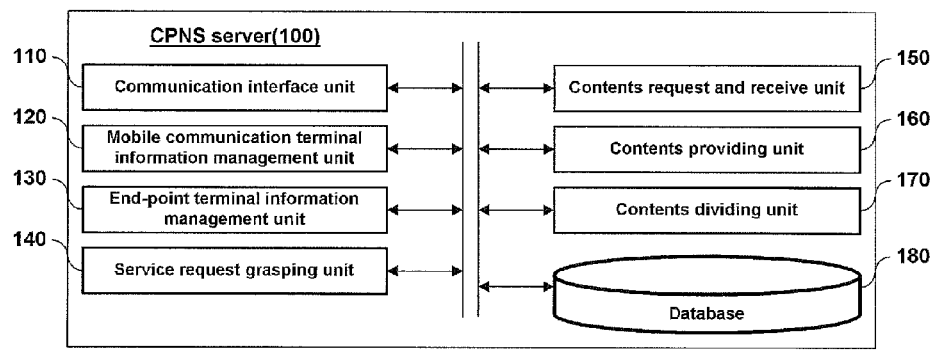

Fig. 4

| Mobile ID | End Device ID | Service Provided | Charging | Game console...... | |
|---|---|---|---|---|---|
| Mobile communication terminal 1 | Game console 1 | Game #2, #5, .... | $10 | LCD, Codec... | ..... .. |
| | PMP 1 | Movie #3, Music #7 | $17 | LCD, Codec... | ..... .. |
| | ,....... | ,....... | | | ..... .. |
| Mobile communication terminal 2 | Game console 1 | Game #1, #5, .... | $14 | LCD, Codec... | ..... .. |
| | PMP 1 | Movie #2, Music #6 | $20 | LCD, Codec... | ..... .. |
| | ,.... .... | ... .... | | | .... ... |

Fig. 5

| End Device ID | Mobile ID | Service Provided | Charging | Information | |
|---|---|---|---|---|---|
| Game console 1 | Mobile communication terminal 1 | Game #2, #5, .... | $10 | Service plan, Transmission rate | .... .. |
| | Mobile communication terminal 2 | Movie #1, #5 | $14 | Service plan, Transmission rate | .... .. |
| | ,........ | ... ... | ... ... | ... ... | .... .. |
| PMP 1 | Mobile communication terminal 1 | Movie #3, Music #7 | $17 | Service plan, Transmission rate | .... .. |
| | Mobile communication terminal 2 | Movie #2, Music #6 | $20 | Service plan, Transmission rate | .... .. |
| | Mobile communication terminal 3 | Movie #5, ... | ... ... | ... ... | .... ... |
| | , ... .... | , ... .... | , ... ... | , ... ... | , ... ... | ns and providing the end-point terminal with a variety of
METHOD AND SYSTEM FOR CONNECTING AN END-POINT TERMINAL TO A PLURALITY OF MOBILE COMMUNICATION TERMINALS TO BE PROVIDED WITH A SERVICE IN A CPNS ENVIRONMENT, AND CPNS SERVER AND END-POINT TERMINAL FOR SAME

TECHNICAL FIELD

The present invention relates to a method and system, a CPNS server, and an end-point terminal, for connecting the end-point terminal to a plurality of mobile communication terminals and providing the end-point terminal with a variety of services in a CPNS environment, and more specifically, to a method and system, a CPNS server, and an end-point terminal, for connecting the end-point terminal to a plurality of mobile communication terminals and providing the end-point terminal with a variety of services in a CPNS environment in which the plurality of mobile communication terminals simultaneously performs short-range wireless communications with the end-point terminal and provides the end-point terminal with a CPNS service.

BACKGROUND ART

With the advancement of information communication technologies, a variety of end-point terminals capable of playing back documents, images and moving pictures, such as MPeg audio layer-3 (MP3) players, Personal Multimedia Players (PMP) and Ultra Mobile Personal Computers (UMPC), are widely used.

A user downloads desired contents from personal computers (PC) and plays back the downloaded contents. However, there is a problem in that the user cannot download desired contents when the user is moving or cannot connect to a PC.

In order to solve the problem, proposed are techniques for adding a communication means connectible to a short-range communication network onto an end-point terminal, such as a Bluetooth or an ultra-wideband (UWB).

According to the techniques, it is possible to download contents from an external device through the short-range wireless communication network. However, there is a problem in that although this method can be used to download the contents stored in external devices, contents desired by the user, but not stored in the external devices, cannot be downloaded.

Furthermore, although short-range wireless communications are used, the user cannot be directly provided with contents or services that the mobile communication terminal has received from service providers or mobile communication companies through conventional cellular communications.

DISCLOSURE OF INVENTION

Technical Problem

Therefore, in order to solve the above problems, a CPNS technique is proposed, in which an end-point terminal such as a PMP or the like is connected to a mobile communication terminal through short-range wireless communication and provided with a desired service by accessing a conventional contents service provider using a cellular communication function of the mobile communication terminal.

On the other hand, although the end-point terminal desires to be connected to another mobile communication terminal to be additionally provided with a service, while being provided with a CPNS service through short-range wireless communication with a mobile communication terminal, the user frequently feels inconvenience since a relevant technique is not provided.

The present invention has been made in view of the problems, and there is provided a method and system, a CPNS server, and an end-point terminal, for connecting the end-point terminal to a plurality of mobile communication terminals and providing the end-point terminal with a variety of services in a CPNS environment in which the plurality of mobile communication terminals simultaneously performs short-range wireless communications with the end-point terminal and provides the end-point terminal with a CPNS service.

Technical Solution

To accomplish the above objects, according to one aspect of the present invention, there is provided a system comprising: a CPNS server for analyzing a transmitted service request and providing the end-point terminal with a service grasped in the analysis, if the end-point terminal performing short-range wireless communication with a first mobile communication terminal requests a CPNS service through a second mobile communication terminal; and the end-point terminal connecting to the second mobile communication terminal through short-range wireless communication, for requesting and receiving a specific CPNS service from the CPNS server and executing the received CPNS service, while being connected to the first mobile communication terminal through a short-range wireless communication network and performing a CPNS service.

If the CPNS service requested by the end-point terminal is a request for new contents to be provided through the second mobile communication terminal, the CPNS server preferably requests and receives the new contents from a server that provides contents and provides the end-point terminal with the new contents via the second mobile communication terminal.

Preferably, the end-point terminal simultaneously outputs contents transmitted from the past and the new contents respectively transmitted from the CPNS server through the first and second mobile communication terminals on a same screen.

If the CPNS service requested by the end-point terminal is a request for addition of a new cellular link due to shortage of available service resources of the first mobile communication terminal, the CPNS server preferably divides contents data currently provided through the first mobile communication terminal based on transmission rates of the first and second mobile communication terminals, and transmits the divided contents data to the first and second mobile communication terminals, respectively.

If the contents respectively transmitted from the CPNS server through the first and second mobile communication terminals are contents divided from the same contents, the end-point terminal preferably merges a plurality of contents into single contents and executes the merged contents.

According to another aspect of the present invention, there is provided a CPNS server for providing a CPNS service requested via a mobile communication terminal from an end-point terminal communicating with a mobile communication terminal through a short-range wireless communication network, the server comprising: a communication interface unit for performing communication through a mobile communication network; a service request grasping unit for analyzing a transmitted service when the end-point terminal performing short-range wireless communication with a first mobile communication terminal requests the CPNS service through a second mobile communication terminal; a contents request and receive unit for requesting and receiving new contents from a server that provides contents, if the CPNS service analyzed by the service request grasping unit is a request for providing the new contents through the second mobile communication terminal; and a contents providing unit for providing the contents received by the contents request and receive unit to the end-point terminal through the second mobile communication terminal.

The contents request and receive unit preferably requests the contents considering information on previously stored specifications of the end-point terminal and the second mobile communication terminal when requesting the new contents.

The CPNS server preferably further comprises: a contents dividing unit for dividing contents data currently provided through the first mobile communication terminal based on transmission rates of the first and second mobile communication terminals, if the CPNS service analyzed by the service request grasping unit is a request for addition of a new cellular link due to shortage of available service resources of the first mobile communication terminal.

The CPNS server preferably further comprises: a mobile communication terminal information management unit for transmitting and receiving information with the end-point terminal through short-range wireless communication, and storing and managing information on the mobile communication terminal that provides the end-point terminal with the CPNS service, as well as the contents provided by the CPNS server, in the database.

The CPNS server preferably further comprises: an end-point terminal information management unit for registering and managing information on the end-point terminal that transmits and receives information to and from the mobile communication terminal through the short-range wireless communication network in the database.

According to still another aspect of the present invention, there is provided an end-point terminal comprising: a communication interface unit for performing communication with a short-range wireless communication network; a playback unit for executing contents transmitted from a mobile communication terminal; a contents request and receive unit for connecting to a second mobile communication terminal through short-range wireless communication and requesting and receiving a specific CPNS service from a CPNS server, while being connected to a first mobile communication terminal through a short-range wireless communication network and performing a CPNS service; a contents processing unit for outputting contents different from each other on a same screen through the playback unit, if the different contents are respectively transmitted from the first and second mobile communication terminals through the contents request and receive unit; and a session management unit for performing session management to establish a session connection for the CPNS service, together with session connections established by a plurality of mobile communication terminals.

The end-point terminal preferably further comprises: a contents merging unit for merging a plurality of contents into single contents and executing the merged contents through the playback unit, if the contents respectively transmitted from the CPNS server through the first and second mobile communication terminals are contents divided from the same contents.

According to still another aspect of the present invention, there is provided a method for connecting an end-point terminal to a plurality of mobile communication terminals and providing the end-point terminal with a variety of services in a CPNS environment, performed in a system comprising a CPNS server, a mobile communication terminal, and an end-point terminal, the method comprising the steps of: a) grasping a transmitted service request, by the CPNS server, when the end-point terminal performing short-range wireless communication with a first mobile communication terminal requests a CPNS service through a second mobile communication terminal; b) providing the end-point terminal with the service grasped in step a) through the first or second mobile communication terminal, by the CPNS server; and c) executing CPNS service information transmitted from the first and second mobile communication terminals, by the end-point terminal.

If the CPNS service grasped in step a) is a request for new contents to be provided through the second mobile communication terminal, in step b), the CPNS server preferably requests and receives the new contents from a server that provides contents and provides the end-point terminal with the new contents via the second mobile communication terminal.

In step c), preferably, the end-point terminal simultaneously outputs contents transmitted from the past and the new contents respectively transmitted from the CPNS server through the first and second mobile communication terminals on a same screen.

If the CPNS service grasped in step a) is a request for addition of a new cellular link due to shortage of available service resources of the first mobile communication terminal, in step b), the CPNS server preferably divides contents data currently provided through the first mobile communication terminal based on transmission rates of the first and second mobile communication terminals, and transmits the divided contents data to the first and second mobile communication terminals, respectively.

In step c), if the contents respectively transmitted from the CPNS server through the first and second mobile communication terminals are contents divided from the same contents, the end-point terminal preferably merges a plurality of contents into single contents and executes the merged contents.

According to still another aspect of the present invention, there is provided a method for connecting an end-point terminal to a plurality of mobile communication terminals and providing the end-point terminal with a variety of services in a CPNS environment, by a CPNS server, the method comprising the steps of: a) grasping a transmitted service request, by the CPNS server, when the end-point terminal performing short-range wireless communication with a first mobile communication terminal requests a CPNS service through a second mobile communication terminal; and b) if the CPNS service grasped in step a) is a request for new contents to be provided through the second mobile communication terminal, requesting and receiving the new contents from a server that provides contents and providing the end-point terminal with the contents via the second mobile communication terminal, by the CPNS server, and if the CPNS service grasped in step a) is a request for addition of a new cellular link due to shortage of available service resources of the first mobile communication terminal, dividing contents data currently provided through the first mobile communication terminal based on transmission rates of the first and second mobile communication terminals, and transmitting the divided contents data to the first and second mobile communication terminals, respectively, by the CPNS server.

According to still another aspect of the present invention, there is provided a method for connecting an end-point terminal to a plurality of mobile communication terminals and providing the end-point terminal with a variety of services in a CPNS environment, by the end-point terminal, the method comprising the steps of: a) connecting to a second mobile communication terminal through short-range wireless communication and requesting a specific CPNS service from a CPNS server, while being connected to a first mobile communication terminal through a short-range wireless communication network and performing a CPNS service, by the end-point terminal; and b) if the CPNS service request is a request for new contents to be provided through the second mobile communication terminal, simultaneously outputting contents transmitted from the past and the new contents respectively transmitted from the CPNS server through the first and second mobile communication terminals on a same screen, and if the CPNS service request is a request for addition of a new cellular link due to shortage of available service resources of the first mobile communication terminal, merging a plurality of contents transmitted from the CPNS server through the first and second mobile communication terminals into single contents, and executing the merged contents.

The method further comprises the step of: examining session-related information so that a session connection for the CPNS service can be established, together with session connections established by a plurality of mobile communication terminals, by the end-point terminal.

Advantageous Effects

The present invention is effective in that since an end-point terminal is connected to a plurality of mobile communication terminals and provided with a variety of CPNS services through the plurality of mobile communication terminals, quality of the services (including data transmission speed) provided to the end-point terminal can be improved.

BRIEF DESCRIPTION OF THE DRAWINGS

FIG. 3 is a view showing the configuration of a CPNS server according to the present invention.

FIG. 4 is a view showing an example of a history information table of a mobile communication terminal according to the present invention.

FIG. 5 is a view showing an example of a history information table of an end-point terminal according to the present invention.

MODE FOR CARRYING OUT THE INVENTION

The converged personal network service (CPNS) disclosed in the present invention allows a portable terminal that can perform only short-range wireless communications, but cannot perform cellular communications with a mobile communication network, to use a data service provided through cellular communications by performing short-range wireless communications with a mobile communication terminal that functions as a personal network service (PN) gateway.

The preferred embodiments of the present invention will be hereafter described in detail, with reference to the accompanying drawings.

Figure 1:
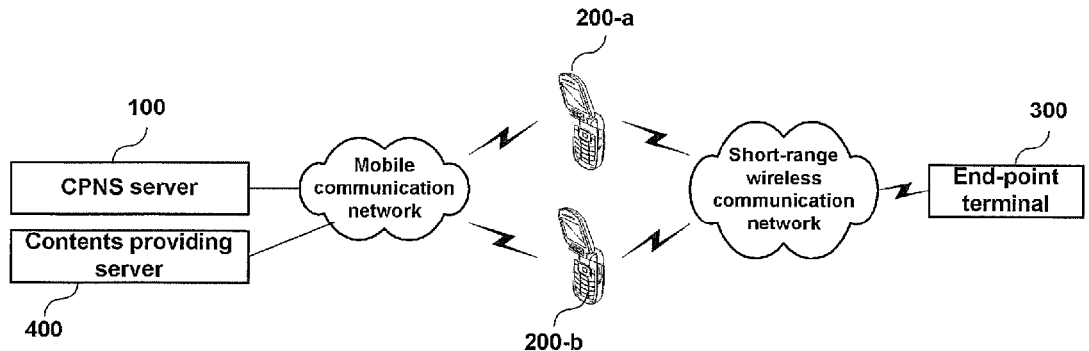
FIG. 1 is a view showing a connection relation between a system and a communication network according to the present invention.

First, FIG. 1 is a view showing a connection relation between a system and a communication network according to the present invention.

The system of the present invention includes a CPNS server 100 for analyzing a transmitted service request and providing an end-point terminal 300 with a service grasped in the analysis, when the end-point terminal 300 performing short-range wireless communication with a first mobile communication terminal 200-*a* requests a CPNS service through a second mobile communication terminal 200-*b*, and the end-point terminal 300 connecting to the second mobile communication terminal 200-*b* through short-range wireless communication, for requesting and receiving a specific CPNS service from a CPNS server 400 and executing the received CPNS service, while being connected to the first mobile communication terminal 200-*a* through a short-range wireless communication network and performing a CPNS service.

In the present invention, the service requested by the end-point terminal 300 is divided into a case of requesting a new service different from a service currently provided by the first mobile communication terminal and a case of additionally requesting a new cellular link due to shortage of available service resources of the first mobile communication terminal.

First, if the CPNS service requested by the end-point terminal is a request for new contents to be provided through the second mobile communication terminal, the CPNS server 100 requests and receives the new contents from a server that provides contents (the contents providing server 400 in FIG. 1) and provides the end-point terminal 300 with the new contents via the second mobile communication terminal 200-*b*.

Here, the end-point terminal 300 simultaneously outputs the contents transmitted from the past and the new contents respectively transmitted from the CPNS server 100 through the first and second mobile communication terminals 200-*a* and 200-*b* on the same screen.

Second, if the CPNS service requested by the end-point terminal is a request for addition of a new cellular link due to shortage of available service resources of the first mobile communication terminal, the CPNS server 100 divides the contents data currently provided through the first mobile communication terminal 200-*a* based on transmission rates of the first and second mobile communication terminals 200-*a* and 200-*b*, and transmits the divided contents data to the first and second mobile communication terminals, respectively.

Here, if the contents respectively transmitted from the CPNS server 100 through the first and second mobile communication terminals 200-*a* and 200-*b* are contents divided from the same contents, the end-point terminal 300 merges a plurality of contents into single contents and executes the merged contents.

The end-point terminal 300 shown in FIG. 1 is a portable terminal having a short-range wireless communication function, such as a PMP, an MP3 player, a navigation terminal of a vehicle, a cellular phone, a game console or the like.

On the other hand, the short-range wireless communication network includes all kinds of communication networks capable of performing short-range wireless communications, such as a wireless LAN, a Bluetooth, a UWB, and the like.

The CPNS server 100, the mobile communication terminals 200 and the end-point terminal 300 shown in FIG. 1 go through an initial setup process in order to use a CPNS service, which will be described below in detail.

Figure 2:
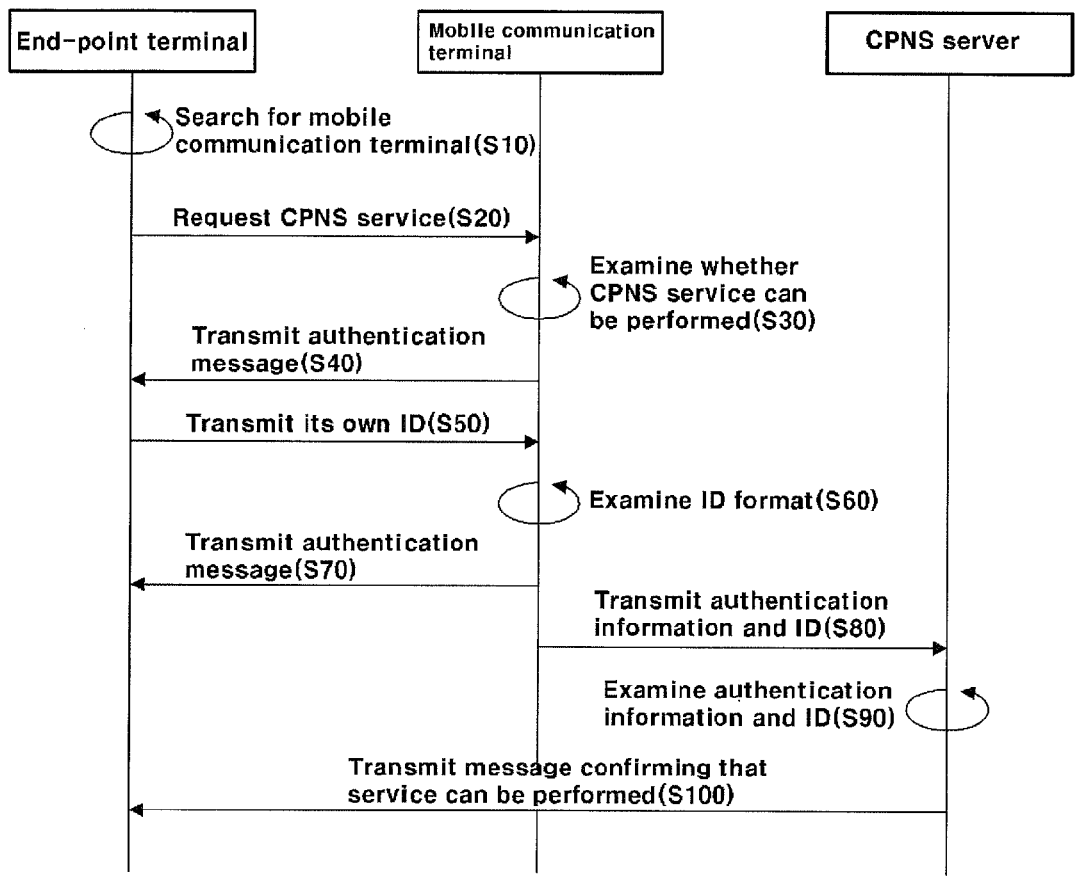
FIG. 2 is a sequence diagram illustrating an initial setup method for using a CPNS service according to the present invention.

FIG. 2 is a sequence diagram illustrating an initial setup method for using a CPNS service according to the present invention.

First, the end-point terminal 300 searches for a mobile communication terminal that will function as a PN gateway device in order to use a CPNS service S10.

Next, the end-point terminal 300 requests a service from the mobile communication terminal 300 searched in step S10. Here, the end-point terminal also transmits information on its capability for performing the CPNS service S20.

Next, if the mobile communication terminal 200 receives a service request transmitted from the end-point terminal, the mobile communication terminal 300 examines whether or not the end-point terminal can perform the CPNS service S30.

If the end-point terminal can perform the CPNS service as a result of the examination in step S30, the mobile communication terminal 200 transmits an authentication message confirming that the CPNS service can be performed, to the end-point terminal 300 S40.

If the authentication message confirming that the CPNS service can be performed is received from the mobile communication terminal, the end-point terminal 300 transmits its identification (ID) S50.

The mobile communication terminal 200 examines whether or not the format of the ID transmitted from the end-point terminal 300 matches an ID format issued by the CPNS, and if the ID formats match, the mobile communication terminal 200 transmits an authentication message confirming that the CPNS service can be performed, to the end-point terminal 300 S60 and S70.

Next, the mobile communication terminal 200 transmits authentication information and IDs of its own and the end-point terminal 300 to the CPNS server 100 S80.

The CPNS server 100 examines the authentication information and IDs transmitted from the mobile communication terminal 200 and determines whether or not the CPNS service can be performed S90.

If both the mobile communication terminal and the end-point terminal can perform the CPNS service, the CPNS server 100 informs the end-point terminal of the fact so that the end-point terminal can perform thereafter the CPNS service including a contents transmission request S100.

If either of the mobile communication terminal or the end-point terminal cannot perform the CPNS service, the CPNS server 100 informs the end-point terminal of the fact and terminates the service.

On the other hand, if the end-point terminal cannot perform the CPNS service as a result of the examination in step S30, the mobile communication terminal 200 transmits a message informing that the CPNS service cannot be performed to the end-point terminal 300 and terminates the service.

On the other hand, if the ID format of the end-point terminal does not match as a result of the examination in step S60, the mobile communication terminal 200 transmits a message informing that the CPNS service cannot be performed to the end-point terminal 300 and terminates the service.

FIG. 3 is a view showing the configuration of a CPNS server according to the present invention.

As shown in the figure, the CPNS server 100 includes a communication interface unit 110, a mobile communication terminal information management unit 120, an end-point terminal information management unit 130, a service request grasping unit 140, a contents request and receive unit 150, a contents providing unit 160, a contents dividing unit 170, and a database 180.

Describing in further detail, the communication interface unit 110 is a constitutional component for performing communication through a mobile communication network.

The mobile communication terminal information management unit 120 transmits and receives information with the end-point terminal 300 through short-range wireless communication, and stores and manages information on the mobile communication terminal 200 that provides the end-point terminal 300 with a CPNS service, including contents provided by the CPNS server 100, in the database 180.

As shown in FIG. 4, the mobile communication terminal information management unit 120 manages information on the mobile communication terminal in the form of a history table, and the mobile communication terminal information includes one or more of an ID of its own (the mobile communication terminal 200), an ID of a connected end-point terminal 300, a provided service, billing information, information on the specification of the connected end-point terminal 300, and a combination of these.

The end-point terminal information management unit 130 registers and manages information on the end-point terminal 300 that transmits and receives information to and from the mobile communication terminal 200 through a short-range wireless communication network in the database 180.

As shown in FIG. 5, the end-point terminal information management unit 130 manages end-point terminal information including one or more of an ID of its own (the end-point terminal 300), an ID of a connected mobile communication terminal 200, a provided service, billing information, service-related information, and a combination of these, and the service-related information includes one or more of a service plan, a transmission rate, and a combination of these.

The service request grasping unit 140 analyzes a transmitted service when the end-point terminal 300 performing short-range wireless communication with the first mobile communication terminal 200-*a* requests a CPNS service through the second mobile communication terminal 200-*b*.

For example, the service request grasping unit 140 grasps whether the CPNS service transmitted from the end-point terminal is a request for new contents, a request for addition of a new cellular link to improve the transmission rate of the currently provided contents data, or a request for a service other than these.

Here, the end-point terminal 300 includes specific information on the requested service in the CPNS service request (e.g., includes the information in the header) transmitted to the CPNS server 100 via the second mobile communication terminal 200-*b* so that the CPNS server can grasp a corresponding service.

The contents request and receive unit 150 requests and receives the new contents from a server that provides contents (the contents providing server 400) if the CPNS service analyzed by the service request grasping unit 140 is a request for providing the new contents through the second mobile communication terminal 200-*b*.

The contents request and receive unit 150 requests the contents considering information on previously stored specifications of the end-point terminal 300 and the second mobile communication terminal 200-b when requesting the new contents.

For example, the specification information includes an LCD size, information on a codec, and the like.

The contents providing unit 160 provides the contents received by the contents request and receive unit 150 to the end-point terminal 300 through the second mobile communication terminal 200-b.

If the CPNS service analyzed by the service request grasping unit 140 is a request for addition of a new cellular link due to shortage of available service resources of the first mobile communication terminal 200-a, the contents dividing unit 170 divides the contents data currently provided through the first mobile communication terminal 200-a based on transmission rates of the first and second mobile communication terminals 200-a and 200-b.

The database 180 stores information related to the CPNS server 100, as well as the information on the mobile communication terminal and the end-point terminal.

Figure 6:
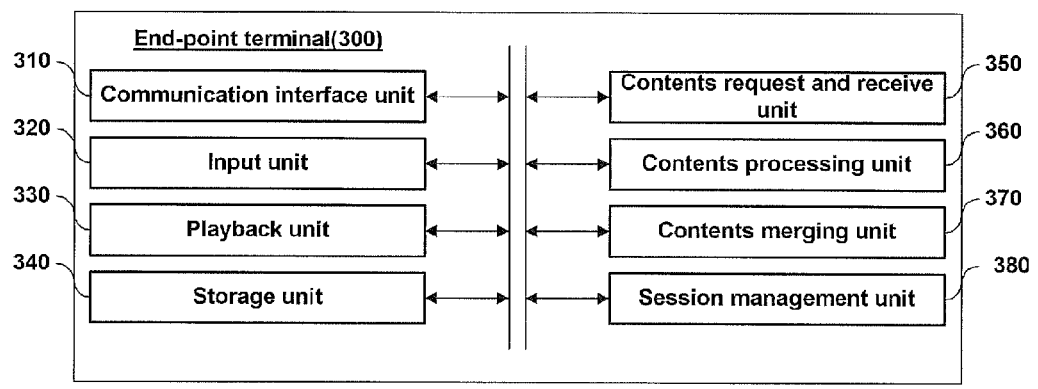
FIG. 6 is a view showing the configuration of an end-point terminal according to the present invention.

FIG. 6 is a view showing the configuration of an end-point terminal according to the present invention.

As shown in FIG. 6, an end-point terminal 300 includes a communication interface unit 310, an input unit 320, a playback unit 330, a storage unit 340, a contents request and receive unit 350, a contents processing unit 360, a contents merging unit 370, and a session management unit 380.

Describing in further detail, the communication interface unit 310 is a constitutional component for performing communication through a short-range wireless communication network.

The input unit 320 receives a corresponding signal depending on a user's selection.

The playback unit 330 executes contents transmitted from the mobile communication terminal.

The storage unit 340 stores information related to the end-point terminal.

The contents request and receive unit 350 connects to the second mobile communication terminal 200-b through short-range wireless communication and requests and receives a specific CPNS service from the CPNS server 100, while being connected to the first mobile communication terminal 200-a through the short-range wireless communication network and performing a CPNS service.

If different contents are respectively transmitted from the first and second mobile communication terminals 200-a and 200-b through the contents request and receive unit 350, the contents processing unit 360 outputs the different contents on the same screen through the playback unit 330.

If the contents respectively transmitted from the CPNS server 100 through the first and second mobile communication terminals 200-a and 200-b are contents divided from the same contents, the contents merging unit 370 merges a plurality of contents into single contents and executes the merged contents through the playback unit 330.

The session management unit 380 performs session management to establish a session connection for the CPNS service, together with session connections established by a plurality of mobile communication terminals.

Figure 7:
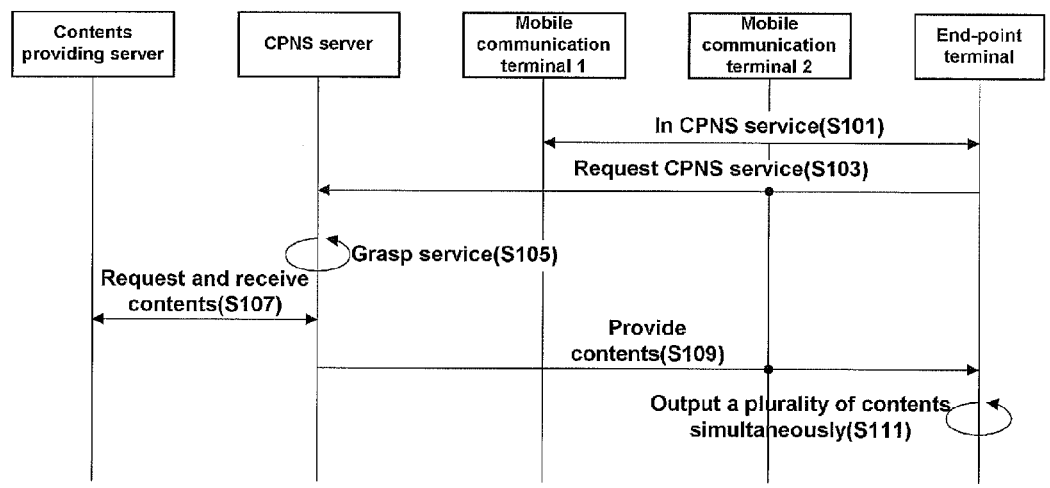
FIG. 7 is a sequence diagram illustrating an example of a method for connecting an end-point terminal to a plurality of mobile communication terminals and providing the end-point terminal with a variety of services according to the present invention.

FIG. 7 is a sequence diagram illustrating an example of a method for connecting an end-point terminal to a plurality of mobile communication terminals and providing the end-point terminal with a variety of services according to the present invention.

First, the end-point terminal 300 connects to the second mobile communication terminal 200-b through short-range wireless communication and requests a specific CPNS service from the CPNS server 100, while being connected to the first mobile communication terminal 200-a through a short-range wireless communication network and performing a CPNS service S101 and S103.

The CPNS server 100 grasps the service request transmitted via the second mobile communication terminal 200-b S105.

The CPNS server 100 provides the end-point terminal 300 with the service grasped in step S105 through the first or second mobile communication terminal 200-a or 200-b.

If the CPNS service grasped in step S105 is a request for new contents to be provided through the second mobile communication terminal 200-b, the CPNS server 100 requests and receives the new contents from a server that provides contents (the contents providing server 400) and provides the end-point terminal 300 with the new contents via the second mobile communication terminal 200-b S107 and S109.

Subsequently, the end-point terminal 300 executes the CPNS service information transmitted from the first and second mobile communication terminals 200-a and 200-b.

Describing in further detail, the end-point terminal simultaneously outputs the contents transmitted from the past and the new contents respectively transmitted from the CPNS server through the first and second mobile communication terminals on the same screen S111.

Although it is not shown in the figure, the end-point terminal 300 examines session-related information so that a session connection for the CPNS service can be established, together with session connections established by a plurality of mobile communication terminals.

Figure 8:
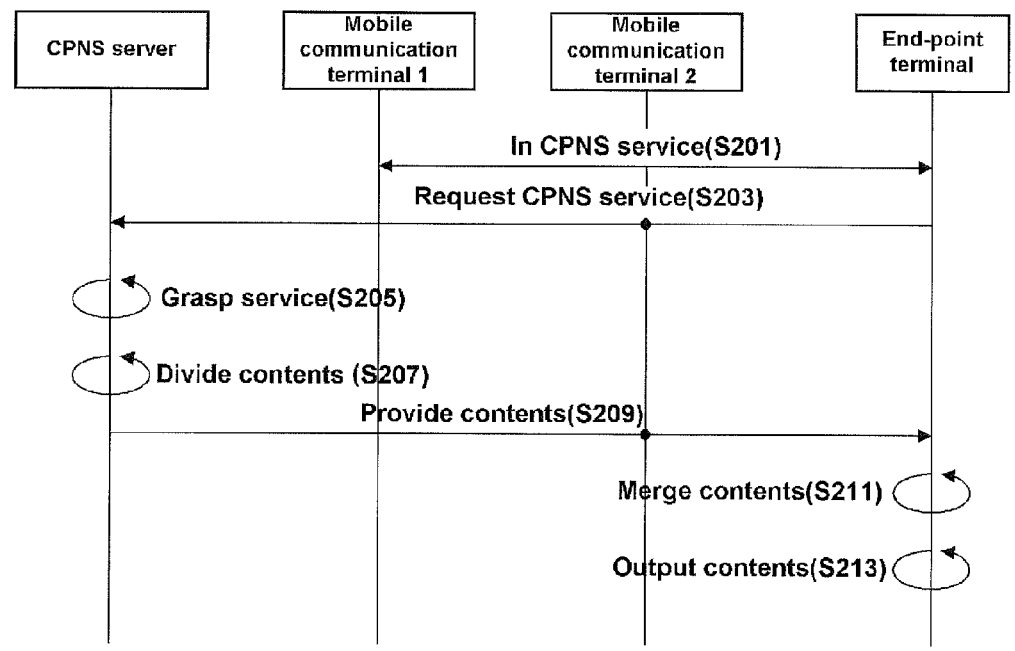
FIG. 8 is a sequence diagram illustrating another example of a method for connecting an end-point terminal to a plurality of mobile communication terminals and providing the end-point terminal with a variety of services according to the present invention.

FIG. 8 is a sequence diagram illustrating another example of a method for connecting an end-point terminal to a plurality of mobile communication terminals and providing the end-point terminal with a variety of services according to the present invention.

First, the end-point terminal 300 connects to the second mobile communication terminal 200-b through short-range wireless communication and requests a specific CPNS service from the CPNS server 100, while being connected to the first mobile communication terminal 200-a through a short-range wireless communication network and performing a CPNS service S201 and S203.

The CPNS server 100 grasps the service request transmitted via the second mobile communication terminal 200-b S205.

The CPNS server 100 provides the end-point terminal 300 with the service grasped in step S205 through the first or second mobile communication terminal 200-a or 200-b.

If the CPNS service grasped in step S205 is a request for addition of a new cellular link due to shortage of available service resources of the first mobile communication terminal, the CPNS server 100 divides the contents data currently provided through the first mobile communication terminal 200-a based on transmission rates of the first and second mobile communication terminals 200-a and 200-b, and transmits the divided contents data to the first and second mobile communication terminals, respectively S207 and S209.

Subsequently, the end-point terminal 300 executes the CPNS service information transmitted from the first and second mobile communication terminals 200-a and 200-b.

Describing in further detail, if the contents respectively transmitted from the CPNS server 100 through the first and second mobile communication terminals 200-a and 200-b are contents divided from the same contents, the end-point terminal 300 merges a plurality of contents into single contents and executes the merged contents S211 and S213.

Although it is not shown in the figure, the end-point terminal 300 examines session-related information so that a session connection for the CPNS service can be established, together with session connections established by a plurality of mobile communication terminals.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

As described above, a method and system, a CPNS server, and an end-point terminal according to the present invention, for connecting the end-point terminal to a plurality of mobile communication terminals and providing the end-point terminal with a variety of services in a CPNS environment, are effective in that the end-point terminal can be simultaneously provided with a variety of services through the plurality of mobile communication terminals since the end-point terminal is connected to the plurality of mobile communication terminals and provided with CPNS services, and quality of the services (including data transmission speed) provided to the end-pointer terminal can be improved since the plurality of mobile communication terminals is simultaneously used.

As described above, a method and system, a CPNS server, and an end-point terminal according to the present invention, for connecting the end-point terminal to a plurality of mobile communication terminals and providing the end-point terminal with a variety of services in a CPNS environment, are suitable for the case where the end-point terminal can be simultaneously provided with a variety of services through the plurality of mobile communication terminals since the end-point terminal is connected to the plurality of mobile communication terminals and provided with CPNS services, and quality of the services (including data transmission speed) provided to the end-pointer terminal can be improved since the plurality of mobile communication terminals is simultaneously used.

The invention claimed is:

1. A system for connecting an end-point terminal to a plurality of mobile communication terminals including at least a first and second mobile communication terminal through a short range wireless communication network and for providing the end-point terminal with a variety of services in a CPNS environment through a mobile communications network, the system comprising:
a CPNS server for analyzing a transmitted service request and providing the end-point terminal with a service grasped in the analysis, when the end-point terminal is in communication with said first mobile communication terminal and requests the CPNS service through said second mobile communication terminal; and
wherein the end-point terminal upon request and receipt of said specific CPNS service from the CPNS server through said mobile communication network executes the received CPNS service, through the second mobile communication terminal via said short-range wireless communication network while being in communication with the first mobile communication terminal for performing said specific CPNS service.

2. The system according to claim 1, wherein if the CPNS service requested by the end-point terminal is a request for new contents to be provided through the second mobile communication terminal, the CPNS server requests and receives the new contents from a server that provides contents and provides the end-point terminal with the new contents via the second mobile communication terminal.

3. The system according to claim 2, wherein the end-point terminal simultaneously outputs contents transmitted from the past and the new contents respectively transmitted from the CPNS server through the first and second mobile communication terminals on a same screen.

4. The system according to claim 1, wherein if the CPNS service requested by the end-point terminal is a request for addition of a new cellular link due to shortage of available service resources of the first mobile communication terminal, the CPNS server divides contents data currently provided through the first mobile communication terminal based on transmission rates of the first and second mobile communication terminals, and transmits the divided contents data to the first and second mobile communication terminals, respectively.

5. The system according to claim 4, wherein if the contents respectively transmitted from the CPNS server through the first and second mobile communication terminals are contents divided from the same contents, the end-point terminal merges a plurality of contents into single contents and executes the merged contents.

6. A CPNS server for providing a CPNS service requested via a mobile communication terminal from an end-point terminal communicating with a mobile communication terminal through a short-range wireless communication network, the server comprising:
a communication interface unit for performing communication through a mobile communication network;
a service request grasping unit for analyzing a transmitted service and for providing the end-point terminal with a service grasped in the analysis when the end-point terminal performing short-range wireless communication with a first mobile communication terminal requests the CPNS service through a second mobile communication terminal while being in communication with the first mobile communication terminal for performing said CPNS service.
a contents request and receive unit for requesting and receiving new contents from a server that provides contents, if the CPNS service analyzed by the service request grasping unit is a request for providing the new contents through the second mobile communication terminal; and
a contents providing unit for providing the contents received by the contents request and receive unit to the end-point terminal through the second mobile communication terminal.

7. The CPNS server according to claim 6, wherein the contents request and receive unit requests the contents considering information on previously stored specifications of the end-point terminal and the second mobile communication terminal when requesting the new contents.

8. The CPNS server according to claim 6, further comprising: a contents dividing unit for dividing contents data currently provided through the first mobile communication terminal based on transmission rates of the first and second mobile communication terminals, if the CPNS service analyzed by the service request grasping unit is a request for addition of a new cellular link due to shortage of available service resources of the first mobile communication terminal.

9. The CPNS server according to claim 6, further comprising: a mobile communication terminal information management unit for transmitting and receiving information with the end-point terminal through short-range wireless communication, and storing and managing information on the mobile communication terminal that provides the end-point terminal with the CPNS service, as well as the contents provided by the CPNS server, in a database.

10. The CPNS server according to claim 6, further comprising: an end-point terminal information management unit for registering and managing information on the end-point terminal that transmits and receives information to and from the mobile communication terminal through the short-range wireless communication network in a database.

11. An end-point terminal comprising:
   a communication interface unit for performing communication with a short-range wireless communication network;
   a playback unit for executing contents transmitted from a mobile communication terminal;
   a contents request and receive unit for connecting to a second mobile communication terminal through short-range wireless communication and requesting and receiving a specific CPNS service from a CPNS server, while being connected to a first mobile communication terminal through a short-range wireless communication network;
   a contents processing unit for outputting contents different from each other on a same screen through the playback unit, if the different contents are respectively transmitted from the first and second mobile communication terminals through the contents request and receive unit; and
   a session management unit for performing session management to establish a session connection for the CPNS service, together with session connections established by a plurality of mobile communication terminals.

12. The end-point terminal according to claim 11, further comprising: a contents merging unit for merging a plurality of contents into single contents and executing the merged contents through the playback unit, if the contents respectively transmitted from the CPNS server through the first and second mobile communication terminals are contents divided from the same contents.

13. A method for connecting an end-point terminal to a plurality of mobile communication terminals through a short range wireless communication network and for providing the end-point terminal with a variety of services in a CPNS environment through a mobile communications network in a system comprising a CPNS server, at least a first and second mobile communication terminal, a short range wireless communication network, a mobile communications network and an end-point terminal, the method comprising the steps of:
   a) grasping a transmitted service request, by the CPNS server, when the end-point terminal performing short-range wireless is in communication with said first mobile communication terminal and requests a CPNS service through said second mobile communication terminal;
   b) providing the end-point terminal with the service grasped in step a) from the CPNS server through said mobile communication network and executing the received CPNS service, through the second mobile communication via said short-range wireless communication network while being in communication with the first mobile communication terminal for performing said CPNS service.

14. The method according to claim 13, wherein if the CPNS service grasped in step a) is a request for new contents to be provided through the second mobile communication terminal, in step b), the CPNS server requests and receives the new contents from a server that provides contents and provides the end-point terminal with the new contents via the second mobile communication terminal.

15. The method according to claim 14, wherein in step c), the end-point terminal simultaneously outputs contents transmitted from the past and the new contents respectively transmitted from the CPNS server through the first and second mobile communication terminals on a same screen.

16. The method according to claim 13, wherein if the CPNS service grasped in step a) is a request for addition of a new cellular link due to shortage of available service resources of the first mobile communication terminal, in step b), the CPNS server divides contents data currently provided through the first mobile communication terminal based on transmission rates of the first and second mobile communication terminals, and transmits the divided contents data to the first and second mobile communication terminals, respectively.

17. The method according to claim 16, wherein in step c), if the contents respectively transmitted from the CPNS server through the first and second mobile communication terminals are contents divided from the same contents, the end-point terminal merges a plurality of contents into single contents and executes the merged contents.

18. A method for connecting an end-point terminal to a plurality of mobile communication terminals and providing the end-point terminal with a variety of services in a CPNS environment, by a CPNS server, the method comprising the steps of:
   a) grasping a transmitted service request, by the CPNS server, when the end-point terminal performing short-range wireless communication with a first mobile communication terminal requests a CPNS service through a second mobile communication terminal; and
   b) if the CPNS service grasped in step a) is a request for new contents to be provided through the second mobile communication terminal, requesting and receiving the new contents from a server that provides contents and providing the end-point terminal with the contents via the second mobile communication terminal, by the CPNS server, and if the CPNS service grasped in step a) is a request for addition of a new cellular link due to shortage of available service resources of the first mobile communication terminal, dividing contents data currently provided through the first mobile communication terminal based on transmission rates of the first and second mobile communication terminals, and transmitting the divided contents data to the first and second mobile communication terminals, respectively, by the CPNS server.

19. A method for connecting an end-point terminal to a plurality of mobile communication terminals and providing the end-point terminal with a variety of services in a CPNS environment, by the end-point terminal, the method comprising the steps of:
   a) connecting to a second mobile communication terminal through short-range wireless communication and requesting a specific CPNS service from a CPNS server, while being connected to a first mobile communication terminal through a short-range wireless communication network and performing a CPNS service, by the end-point terminal; and
   b) if the CPNS service request is a request for new contents to be provided through the second mobile communication terminal, simultaneously outputting contents transmitted from the past and the new contents respectively transmitted from the CPNS server through the first and second mobile communication terminals on a same screen, and if the CPNS service request is a request for addition of a new cellular link due to shortage of available service resources of the first mobile communication terminal, merging a plurality of contents transmitted from the CPNS server through the first and second mobile communication terminals into single contents, and executing the merged contents.

20. The method according to claim 19, further comprising the step of: examining session-related information so that a session connection for the CPNS service can be established, together with session connections established by a plurality of mobile communication terminals, by the end-point terminal.

* * * * *